April 28, 1970   F. A. LOUGHRIDGE ET AL   3,508,900
QUARTZ MELTING AND TUBE FORMING FURNACE
Filed Aug. 12, 1966   3 Sheets-Sheet 1

FIG. I

RICHARD G. BRITT
FREDERICK A. LOUGHRIDGE
INVENTORS

BY *Lawrence Burns*,
ATTORNEY

RICHARD G. BRITT
FREDERICK A. LOUGHRIDGE
INVENTORS

United States Patent Office 3,508,900
Patented Apr. 28, 1970

3,508,900
QUARTZ MELTING AND TUBE
FORMING FURNACE
Frederick A. Loughridge, Manchester, and Richard G. Britt, Burlington, Mass., assignors to Sylvania Electric Products Inc., a corporation of Delaware
Filed Aug. 12, 1966, Ser. No. 572,110
Int. Cl. C03b 15/14
U.S. Cl. 65—157                                7 Claims

ABSTRACT OF THE DISCLOSURE

An electrically heated quartz melting and tube forming furnace having a functionally shaped mandrel head and an adjustment mechanism that provides vertical, horizontal, and angular adjustment of the mandrel shaft. The mandrel head has an upper and lower portion separated by an intermediate ring. The upper portion includes a pair of oppositely disposed truncated cones separated by an upper ring of diameter equal to the base diameter of the cones. The lower portion includes a truncated cone of smaller base diameter than the upper cones and a lower ring disposed on the base of the lower cone. The intermediate ring has a diameter substantially equal to the apexes of the upper cones. The adjustment mechanism includes a tilt ball positioned at the top of the mandrel shaft and held within a pliant seal. A housing for the tilt ball is fitted to the top of a slide plate. Set screws fixed to the slide plate provide angular adjustment and a series of clamps which adjust the slide plate, and a screw portion provide the horizontal and vertical adjustment respectively.

This invention relates to electrically heated furnaces for melting quartz or quartz-like glass and transforming such glass into tubular shapes. More particularly, the invention concerns a furnace having a uniquely shaped mandrel head by which the dimensions of the product can be modified easily.

Numerous methods of forming quartz tubing have evolved into one practiced, operational method in which quartz crystals were placed into a crucible. Disposed about the crucible was an electrical heating element. In operation, the heating element melted the quartz crystals into a molten pool commonly known as a "melt." Inside of the crucible holding the melt was a centrally positioned mandrel shaft having a mandrel head which cooperated with a fixed orifice ring located at the bottom of the crucible. Adjustment of this mandrel shaft and mandrel control the rate of flow of the melt leaving the crucible, which in turn controls the finished dimensions of the product.

Many problems were encountered with the above-mentioned equipment. Most centered around the adjustment of the mandrel shaft and in maintaining a uniform temperature throughout the melt. With regard to the latter, we have discovered that when a hollow mandrel shaft carrying protective gas is placed in the melt, the area about the shaft is at a lower temperature than the other portions of the melt, thereby inducing variations in flow. The mandrel not only aids in the formation of the tubing, but more importantly controls the final dimensions of the product.

There are many factors involved in designing a mandrel which fulfills these requirements, but one of the prime prerequisites is to allow adequate flow of the melt from the crucible, thus producing a finished product of uniform dimensions. As the melt flows from the crucible, it passes over the exterior surfaces of the mandrel, which is located in an orifice at the bottom of the crucible. The formed melt gradually cools from a plastic state to a hardened or congealed condition as it flows from the crucible.

Hence we have discovered that is is necessary to design the mandrel so that it extends into the zone of plasticity, but terminates just short of the zone where the quartz congeals so that final critical dimensions of the product can be realized.

Our mandrel overcomes the above-mentioned heating disadvantages. It has a general configuration similar to that of an hour glass, which is very functional. One important advantage of the hour glass-type shape is that the upper part initiates flow currents which promotes uniform temperature within the melt. This is a very important feature since for good drawing, the melt must have a uniform viscosity. Also, in the type of furnaces mentioned above, the mandrel is usually centrally located in the melt. Normally, a relatively cool gas flows through the mandrel shaft and causes a temperature differential and hence, the quartz surrounding the shaft is colder than the rest of the melt. With the above described circulation paths generated by the shape of the die core, the cold areas usually found in prior art equipment are eliminated.

We have also provided an adjustment mechanism that maintains spatial relationship between the mandrel and the orifice ring by adjusting the mandrel in relation to the orifice ring horizontally, vertically and angularly to provide measured flow of the melt from the crucible.

The primary object of our invention is to produce tubular stock from quartz crystals, which stock has close internal dimensional tolerances.

A feature of our invention is providing means for controlling critical spatial relationship between a mandrel and orifice during drawing.

Another feature is to provide a mandrel, having an hour glass shape that will enhance continuous flow of the melt from the crucible.

An added feature is to provide a die core head that will produce circulation paths within the melt.

These and other objects, features and advantages of the invention will be more readily understood and appreciated from the following detailed description of a preferred embodiment and shown in the accompanying drawings in which.

Figure 1:
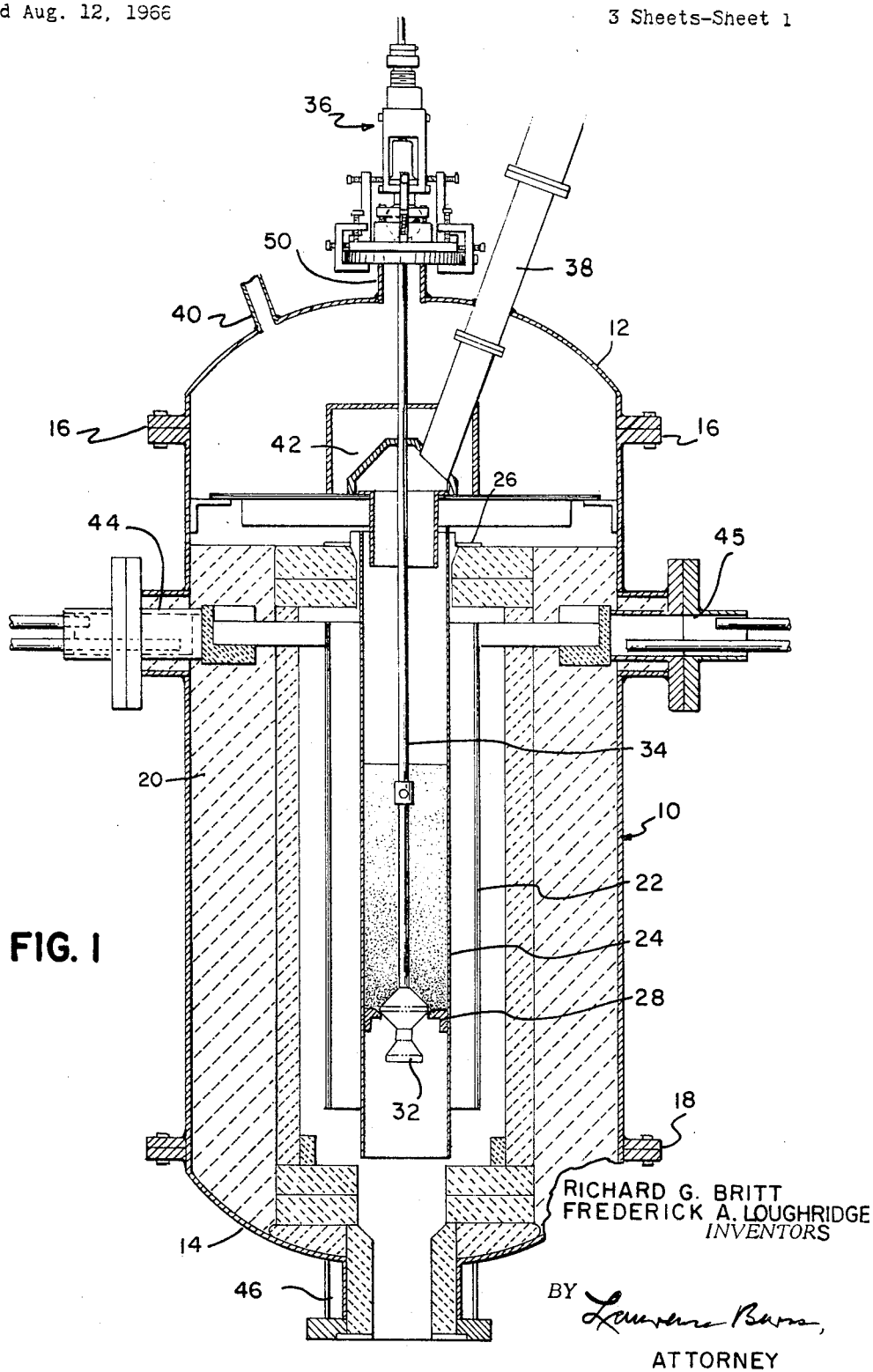
FIGURE 1 is an elevational view of the melting furnace, shown in cross-section to show more clearly the features of the invention.

We have also discovered that with this particular shape of mandrel a high flow rate at the drawing orifice is realized which is also very advantageous, especially in forming varied sized tubings.

Referring to FIG. 1, the furnace of our invention includes a main cylindrical container 10 having upper and lower closures 12 and 14 mated to the main cylinder by flange members 16 and 18. Located within the main cylinder 10 is a network of thermal insulating material 20, such as for example, a ceramic form placed about the interior cavity of the main cylinder, to insulate the outer container 10 from an interior basket-type heating element 22. For example, the heater described in the United States Patent 3,178,665, of Matheson et al., can be used advantageously. The heating element 22 encompasses a tubular refractory metal crucible 24 that is held in place at its upper end by a lip 26 resing on the top surface of the insulating material 20. Located within the lower cavity of the crucible 24 is an orifice ring 28 having a circular wedge-type orifice 30, more clearly seen in FIG.

3. A mandrel 32 is suspended in and axially aligned in the orifice 30 by a hollow mandrel shaft 34. Shaft 34 is provided with an adjustable mechanism 36 near its upper end, that adjusts the mandrel 32 vertically and laterally as well as angularly for control of uniform dimensions.

The upper closure 12 is also provided with a filler tube 38 used for the loading of crushed quartz to the interior crucible. Also located in the top closure is a purge gas inlet tube 40 for flushing and evacuating air from the interior of the furnace at the start and during drawing. A protective gas is also fed to the extreme end of the hollow mandrel shaft 34 to provide the mandrel 32 with a constant stream of protective gas which is necessary to maintain the inner diameter of the tubing and to prevent contamination of the glass itself.

A high temperature furnace of this type has areas that must be maintained at lower operating temperatures than the rest of the furnace. Therefore areas such as crystal inlet 42, heating element supports 44 and 45 and exit flange 46 must be provided with suitable cooling means, for example, water circulation.

Figure 2:
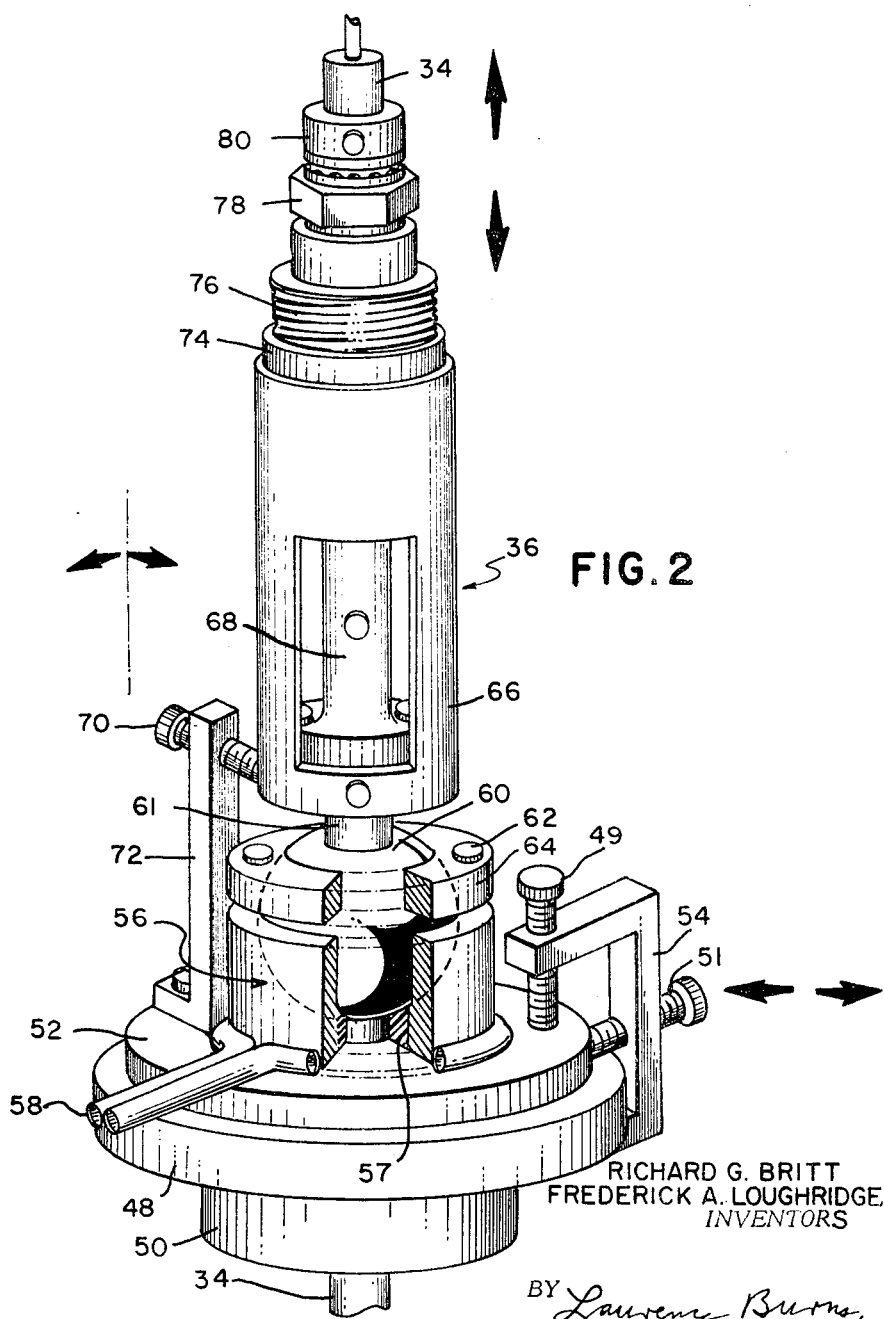
FIGURE 2 is a perspective view of the mandrel adjustment mechanism.

As mentioned above, the adjustment mechanism 36 for the mandrel 32 is located at the upper end of the mandrel shaft 34 as viewed in FIGS. 1 and 2. A top cap flange 48 is welded to an extension 50 of the top closure 12 to provide a platform to support a slide plate 52. Three equally spaced adjustment clamps 54 that are welded to the flange 48 are provided with vertical and horizontal positioning screws 49 and 51 respectively. The vertical screws 49 are used to hold the slide plate 52 in a fixed position after the horizontal screws 51 are utilized to adjust the slide plate 52 for axial alignment of the mandrel shaft 34.

A ball seat housing 56 is fitted to the top of the slide plate 52 and is provided with a pliant seal 57 which can be made of neoprene or the like. A separate coolant line 58 cools the seal 57 and maintains it in operative condition. Within this housing, which is provided with an enlarged bore at the base, a tilt ball 60 is confined within a half-spherical relief formed on the internal surface therof by a pressure collar 64 which in turn is held in place by fasteners 62. Te mandrel rod 34 extends above the ball 60 and passes through an adjustment collar 66 having an internal rotation seal 68 which provides proper sealing of the mandrel rod. The angular adjustment of the mandrel rod is accomplished by set screws 70 leaning against the collar 66 held in upstanding clamps 72 fixed to the slide plate 52. Three clamps 72 are spaced equally about the collar 66. As mentioned above, only one is shown for clarity of the drawing. The top part of the collar 66 is fitted with a screw housing 74 for the insertion of a screw portion 76 of the mandrel shaft 34. The screw portion 76 is moved for vertical adjustment of the mandrel by a nut 78 keyed to the end of the shaft 34 and held in place by a stop collar 80. With the above described adjustment components, the mandrel shaft 34 carrying the mandrel head 32 can be adjusted horizontally, vertically or both. These adjustments provide the mandrel with the latitude of central adjustment needed to form tubing.

Figure 3:
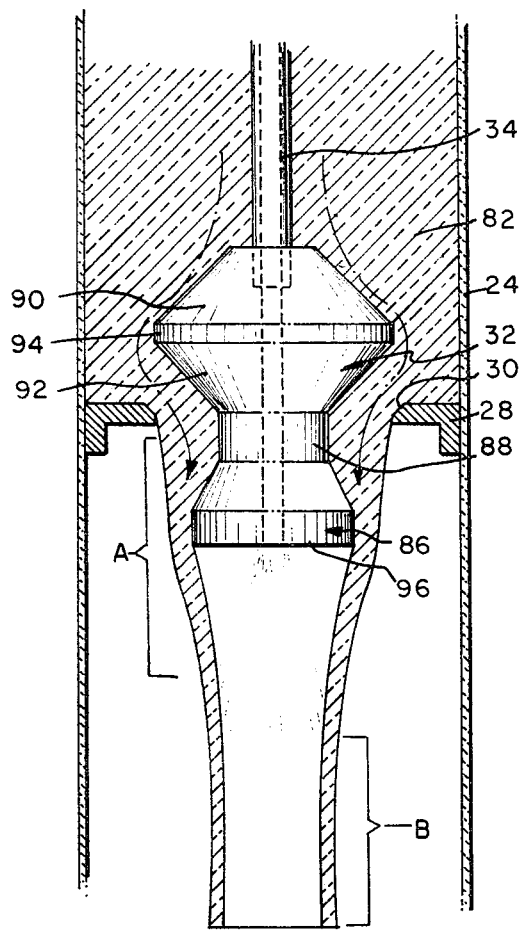
FIGURE 3 is an enlarged sectional view of the mandrel and its relation to the orifice ring and showing in particular the flow of material around the mandrel.

As viewed in FIG. 3, the mandrel 32 is illustrated in enlarged section to show the relationship between the mandrel 32 and the orifice ring 28 which determines the final dimensions of the tubing. The mandrel comprises and upper and lower portion. The upper portion of the mandrel includes an upper and lower truncated cones 90 and 92 joined back to back with a hollow upper ring 94. The diameter of the ring 94 equals the diameter of the respective bases. A truncated cone 86 is disposed below the upper cones 90 and 92 and has a lower ring 96 of a height greater than that of the upper ring 94 which is disposed at the base of the lower cone. Disposed between the upper cones 90 and 92 and the lower cone 86 is an intermediate ring 88 of a diameter equal to the apex of the upper and lower cones.

As mentioned above, the shape of the mandrel provides a homogeneous flow of melt between the orifice 28 and the mandrel 32 and also creates circulation paths to maintain uniform temperatures in the crucible 24. The circulation paths are shown by the arrow lead lines in FIG. 3 to define clearly a continuous flow of melt over the face of the top cones and the recirculation paths of the melt as it passes by the area of ring 94. The recessed area 88 provided maximum clearance for the melt as it passes out of the orifice 30.

The lower ring 96 is a critical dimension of the mandrel. It is spaced a distance away from the orifice 30 so that the melt 82 is still in a zone of plasticity, designated as A in the drawing. With further downward travel the melt reaches a zone of congelation designated as B where the tubing is in a finished form. As mentioned above, a protective gas is fed to the interior of the tubing through the hollow mandrel shaft 34 for maintaining the inner diameter of the tubing and also to prevent air from reaching the interior of the mandrel shaft which under these conditions would destroy the shaft by oxidation.

As mentioned above, the mandrel 32 can be vertically adjusted to bring the conical face of the inverter cone 92 in register with a mating edge of the orifice ring 28 to provide a positive stop plug to prevent flow of the melt when necessary or regulate flow by a valving action.

A brief description can now be given to typify an operational sequence. The feed pipe 38 is closed off and nitrogen is flushed through. The crystals are then fed into the crucible 24 which is maintained at a temperature of about 2000° C. Part of the temeprature maintenance relies upon controlling the feed of rate of the crystals. Moreover, the feed rate is also important so that a constant level of melt stays in the crucible 24. Level of melt in turn, aids in controlling the wall thickness of the tubing. When the melt 82 is at the proper consistency, the mandrel 32 is accurately adjusted by centering the mandrel in the orifice 30. The wall thickness of the tubing, as mentioned above, is controlled by the size of the opening between the mandrel 32 and the orifice 30 together with the temperature of the melt, the level and by the drawing rate. The operating parameters are finally determined by finding the range of these variables which give the desired dimensions and ease of control.

What we claim is:

1. An electrically heated furnace for melting quartz comprising: a tubular crucible surrounded by a heating element; a mandrel head positioned in an orifice at the bottom of said crucible, said mandrel head comprising an upper portion and a lower portion, said upper portion including a pair of truncated cones, oppositely disposed, base to base, and separated from one another by an upper ring, the diameter of said ring being substantially equal to the diameter of the bases of the truncated cones; said lower portion comprising a truncated cone or smaller base diameter than said upper cones and spaced from said upper cones by an intermediate ring, said intermediate ring having a diameter substantially equal to the apexes of said upper cones, said lower cone having a substantially smaller base than said upper cone; a lower ring disposed on the base of said lower cones, whereby melted quartz heated by said heating element passes from said crucible over said mandrel head.

2. The furnace according to claim 1 wherein the mandrel head is provided with means defining centrally located tubular passage; a hollow mandrel shaft supporting said mandrel head and in gas flow relation with said tubular passage and disposed in said melt and extending outside of said furnace.

3. The furnace according to claim 1, wherein said heating element comprises a refractory wire mesh bottomless basket having three equally spaced support arms.

4. An electrically heated furnace for melting quartz comprising: a tubular crucible surrounded by a heating element; means defining an orifice at the bottom of said crucible; a mandrel head positioned in said orifice means; said mandrel head comprising an upper portion and a lower portion, said upper portion including a pair of truncated cones, oppositely disposed, base to base, and separated from one another by an upper ring, the diameter of said upper ring being substantially equal to the diameter of the bases of the truncated cones; said lower portion comprising a truncated cone of smaller base diameter than said upper cones and spaced from said upper cones by an intermediate ring, said intermediate ring having a diameter substantially equal to the apexes of said upper cones and said lower cone, said lower cone having a substantially smaller base than said upper cones; a lower ring disposed on the base of the said lower cone, means defining a tubular passage extending from the top to bottom of said mandrel head, hollow mandrel shaft disposed in gas flow relation with said tubular passage means and support said mandrel head in said orifice means; whereby a passageway from one end of the hollow mandrel shaft to the end of the mandrel head is established for flowing a forming gas to protect said mandrel shaft from heat and oxidation.

5. An electrically heated furnace for melting quartz comprising: a tubular melting crucible surrounded by a heating element, a mandrel positioned in an orifice at the bottom of said crucible, said mandrel supported by a mandrel shaft, said mandrel shaft extending to the outside of said furnace, adjustment means disposed at the end of the mandrel shaft, said adjustment means comprising a circular slide plate held and horizontally adjusted by equally spaced clamps, a tilt ball housing affixed to said slide plate, means connected to said slide plate for effecting the angular adjustment of said mandrel shaft, an elongated adjustment collar spaced from said tilt ball housing and encompassing said mandrel shaft, said adjustment collar having a screw-housing at its upper end, an adjustment screw positioned at the top of said mandrel shaft whereby said mandrel shaft can be adjusted in a vertical direction.

6. The furnace according to claim 5 wherein said mandrel shaft, said mandrel and said orifice ring are formed of tungsten or molybdenum.

7. The furnace according to claim 5 wherein said tilt ball housing comprises a tubular housing member; a half spherical relief formed on the internal surface of said housing member and means defining an enlarged bore at the base thereof; a pliable seal located in the said bore of said spherical relief; a pressure collar spaced above said tilt ball housing, a ball positioned on said mandrel shaft, said ball disposed inside said relief of said housing member and held in engagement with said seal by said pressure collar, whereby said mandrel shaft can be axially adjusted and maintained in sealed condition.

References Cited

UNITED STATES PATENTS

| 1,750,971 | 3/1930 | Soubier | 65—187 |
| 3,063,268 | 11/1962 | Knisely | 65—187 |
| 3,178,665 | 4/1965 | Matheson et al. | 338—208 XR |
| 3,269,821 | 8/1966 | Vatteroot | 65—129 |
| 3,248,204 | 4/1966 | Tyner | 65—330 |

S. LEON BASHORE, Primary Examiner

S. R. FRIEDMAN, Assistant Examiner

U.S. Cl. X.R.

65—187, 335, 347, 374